US010999495B1

(12) United States Patent
Lee et al.

(10) Patent No.: US 10,999,495 B1
(45) Date of Patent: May 4, 2021

(54) INTERNET OF THINGS-BASED INDOOR SELFIE-SUPPORTING CAMERA SYSTEM

(71) Applicant: VALUEDATA CO., LTD., Gwangmyeong-si (KR)

(72) Inventors: Sunmee Lee, Gimcheon-si (KR); Sangchun Jung, Gimcheon-si (KR); So Hyun Jin, Seoul (KR)

(73) Assignee: VALUEDATA CO., LTD., Gwangmyeong-si (KR)

( * ) Notice: Subject to any disclaimer, the term of this patent is extended or adjusted under 35 U.S.C. 154(b) by 0 days.

(21) Appl. No.: 16/674,936

(22) Filed: Nov. 5, 2019

(51) Int. Cl.
*H04N 5/232* (2006.01)
*H04W 4/70* (2018.01)

(52) U.S. Cl.
CPC ..... *H04N 5/23222* (2013.01); *H04N 5/23219* (2013.01); *H04W 4/70* (2018.02)

(58) Field of Classification Search
CPC .............. H04N 5/23222; H04N 5/23219
See application file for complete search history.

(56) References Cited

U.S. PATENT DOCUMENTS

| 2011/0115612 | A1* | 5/2011 | Kulinets | H04N 5/232 340/10.42 |
| 2015/0260474 | A1* | 9/2015 | Rublowsky | A63F 13/213 434/16 |
| 2015/0281568 | A1* | 10/2015 | Kamada | H04N 5/23222 348/207.1 |
| 2018/0249115 | A1* | 8/2018 | Cronin | H04N 5/77 |
| 2020/0084388 | A1* | 3/2020 | Iinuma | G06F 21/81 |

* cited by examiner

*Primary Examiner* — Christopher K Peterson
(74) *Attorney, Agent, or Firm* — Goldilocks Zone IP Law

(57) ABSTRACT

An internet of things-based indoor selfie-supporting camera system includes: sensing units respectively disposed in a plurality of indoor photographing stages to receive personal information from a portable terminal of a user using a radio-frequency identification (RF) tagging method; image capture units configured to capture an image with any one indoor photographing stage selected from the plurality of indoor photographing stages in the background, based on positional information transmitted from the sensing units and the personal information of the user; and a data server configured to store image data transmitted from the image capture units and the personal information of the user in a database, and transmitting the image data using the personal information of the user.

8 Claims, 2 Drawing Sheets

[FIG. 1]
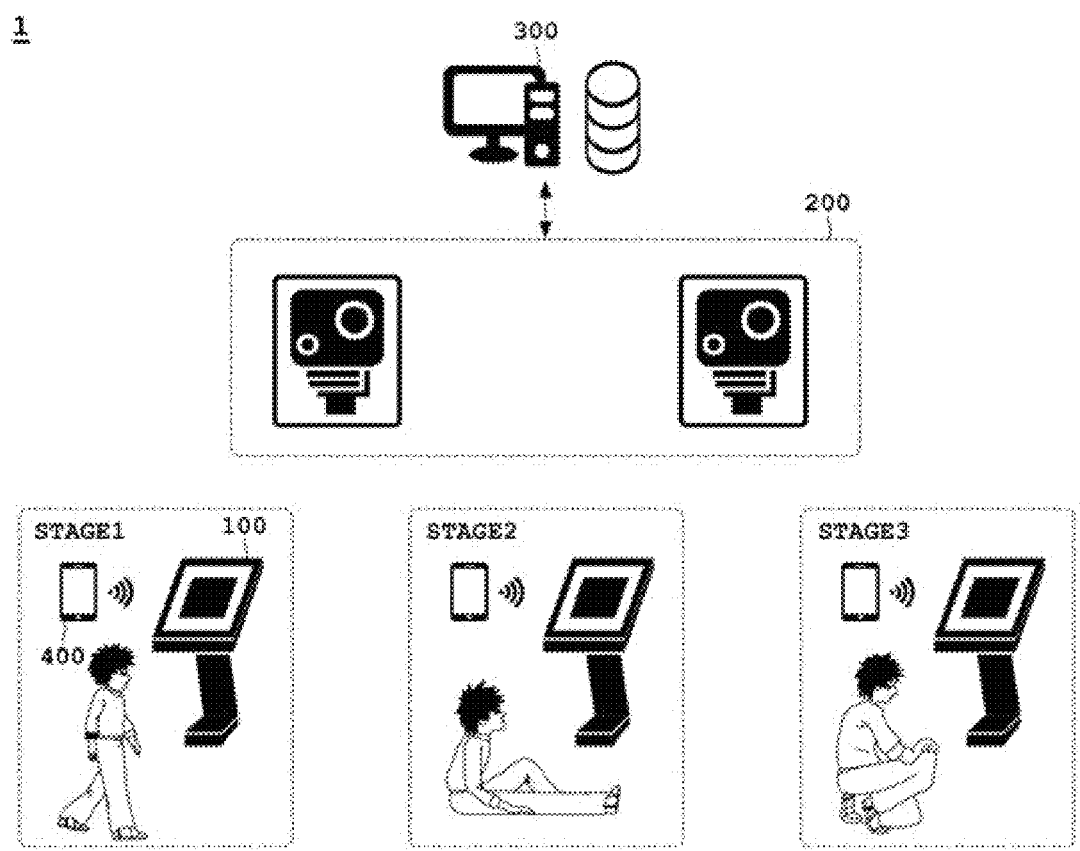

[FIG. 2]
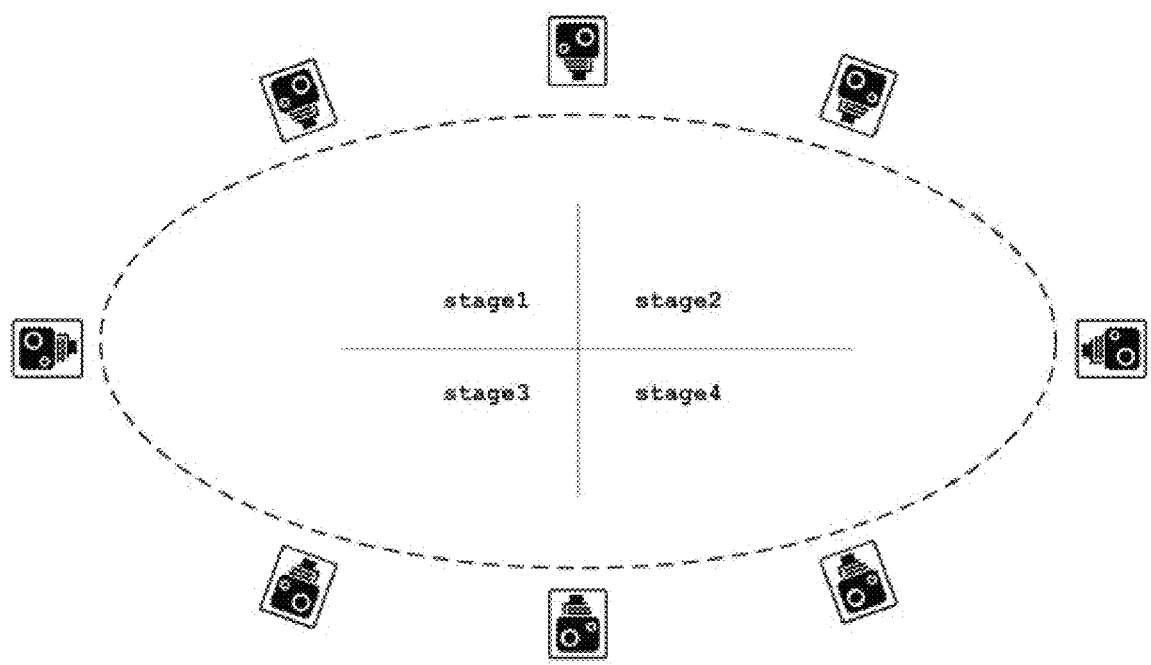
[FIG. 3]
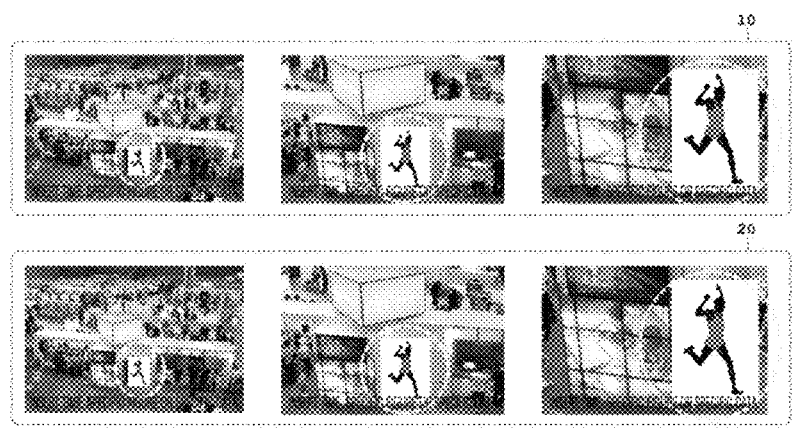

INTERNET OF THINGS-BASED INDOOR SELFIE-SUPPORTING CAMERA SYSTEM

TECHNICAL FIELD

The present invention relates to a camera system, and more specifically, to an internet of things-based indoor selfie-supporting camera system.

BACKGROUND ART

Recently, a portable terminal is basically provided with a camera, and supports a photographing function using the camera. During taking a picture, a user presses a key of the portable terminal or touches a button on a screen thereof to perform photographing with the camera.

Meanwhile, when a user touches the button on the screen during taking a picture, the user typically touches the button with a thumb. Therefore, during taking a picture, a hand holding the portable terminal may be shaken or a posture of the hand may become unstable. In particular, when performing a selfie (self-photographing), the portable terminal may be further shaken.

Therefore, in order to solve the above-described problems, Korean Patent Laid-Open No. 10-2013-0054576 proposes "a method and an apparatus for self-camera photographing." However, in the method and the apparatus for self-camera photographing, it is difficult to automatically capture a user's own image for each shot type of a short-range (close-up), a mid-range (mid-shot), and a long-range (long-shot) together with surrounding environments, as well as it is difficult to provide a service for processing and analyzing the captured image to the user.

In addition, when the user performs a selfie using his or her own portable terminal, a picture within only a narrow range of background can be taken even if using a selfie stick.

SUMMARY OF INVENTION

Problems to be Solved by Invention

In consideration of the above-mentioned circumstances, it is an object of the present invention to provide an internet of things-based indoor selfie-supporting camera system which is capable of taking an image with indoor photographing stages in which a user is located in the background, and transmitting image data using personal information of the user.

Means for Solving Problems

According to an aspect of the present invention, there is provided an internet of things-based indoor selfie-supporting camera system, the system including: sensing units respectively disposed in a plurality of indoor photographing stages to receive personal information from a portable terminal of a user using a radio-frequency identification (RF) tagging method; image capture units configured to capture an image with any one indoor photographing stage selected from the plurality of indoor photographing stages in the background, based on positional information transmitted from the sensing units and the personal information of the user; and a data server configured to store image data transmitted from the image capture units and the personal information of the user in a database, and transmit the image data using the personal information of the user.

In addition, when receiving the personal information of the user by the sensing unit from the portable terminal of the user through a wireless communication method, the image capture unit may transmit an image to be captured to the portable terminal of the user in real time.

Further, the personal information may include at least one or more of a telephone number, an e-mail address, and a social network service account.

Further, the image capture unit may operate in any one mode of a selfie-supporting mode and a security mode, and in the security mode, the image capture unit may automatically determine a photographing direction based on detected data of pressure sensors disposed on bottom surfaces of the plurality of indoor photographing stages and object recognition of the image, and transmit an image captured in the security mode to the data server in real time.

Further, the data server may determine whether the user has visited all the plurality of indoor photographing stages based on the positional information, the image data, and the personal information of the user, and when it is determined that the user has visited all the plurality of indoor photographing stages, transmit information of the user to a preset augmented reality game server, and when the user accesses the augmented reality game server to play a game, the augmented reality game server may dispose augmented reality game items around the plurality of indoor photographing stages.

Furthermore, the image capture unit may be configured to capture a still image and a moving image in a visible light band, and a still image and a moving image in an infrared band.

Advantageous Effects

In accordance with the internet of things-based indoor selfie-supporting camera system according to an embodiment of the present invention, it is possible to capture an image with the indoor photographing stages in which a user is located in the background, and conveniently transmit the image data using personal information of the user to the portable terminal thereof.

Further, in accordance with an internet of things-based indoor selfie-supporting camera system 1 according to the embodiment of the present invention, it is possible to solve a situation in which a desired image cannot be obtained at a limited angle of view, automatically capture a user's own image for each shot type of a short-range, a mid-range, and a long-range together with surrounding environments by a simple operation, and transmit the captured image to the user in various ways such as an e-mail or a short message service through a network transmission, as well as, provide past photo data to the user in future visits according to an additional request thereof by storing the photo data requested by the user in a database. In addition, it is possible to obtain a desired selfie picture, which is hard to be obtained by operating the camera with his or her hand, by driving image capture units 200 in real time, which are installed in advance at a short range, and mid/long ranges.

BRIEF DESCRIPTION OF DRAWINGS

FIG. 1 is a view illustrating a configuration of an internet of things-based indoor selfie-supporting camera system 1 according to an embodiment of the present invention.

FIG. 2 is a view illustrating an arrangement of the internet of things-based indoor selfie-supporting camera system 1 of FIG. 1.

FIG. 3 is image data photographed using the internet of things-based indoor selfie-supporting camera system 1 of FIG. 1.

MODE FOR CARRYING OUT INVENTION

Hereinafter, preferred embodiments of the present invention will be described in detail with reference to the accompanying drawings, so that persons having common knowledge in the technical field to which the present invention pertains may easily implement the invention based on the technical spirit thereof.

FIG. 1 is a view illustrating a configuration of an internet of things-based indoor selfie-supporting camera system 1 according to an embodiment of the present invention.

The internet of things-based indoor selfie-supporting camera system 1 according to the embodiment of the present invention includes only a simplified configuration for clearly describing the technical idea to be proposed by the present invention.

Referring to FIG. 1, the internet of things-based indoor selfie-supporting camera system 1 generally includes a plurality of sensing units 100, image capture units 200, a data server 300, and a portable terminal 400.

Herein, the sensing units 100, the image capture units 200, and the data server 300 are configured to exchange data and control signals with each other using a wired or wireless communication method. That is, the internet of things-based indoor selfie-supporting camera system is configured that the respective components may exchange data with each other using a communication environment or a communication system such as machine-to-machine (M2M) communication or Internet of Things (IoT).

The detailed configuration and major operation of the internet of things-based indoor selfie-supporting camera system 1 configured as mentioned above will be described in detail below.

The sensing units 100 are disposed at a plurality of indoor photographing stages STAGE, respectively, thus to receive personal information from the portable terminal of a user using a radio-frequency identification (RF) tagging method. In addition, the sensing unit 100 is configured to be able to perform a payment for photographing. The sensing unit 100 is defined as a fixed terminal that transmits positional information so that the user may perform a selfie with the current indoor photographing stages STAGE in the background.

That is, in the embodiment of the present invention, the indoor photographing stage STAGE refers to a photographing place designated so as to take a picture with an exhibition, a fair, and a theme space in the background. Each of the indoor photographing stages STAGE is equipped with the sensing unit 100. For example, in an exhibition or a fair in which a plurality of booths are installed, each booth may be defined as one indoor photographing stage STAGE.

The plurality of indoor photographing stages STAGE include pressure sensors disposed on bottom surfaces thereof. The sensing unit 100 may detect a position of a user based on the detected results of the pressure sensors, and then may transmit the positional information of the user to the image capture unit 200. Therefore, the image capture unit 200 may capture an image about a point in which the user is located.

When the user inputs personal information of at least any one of a telephone number, an e-mail address, and a social network service (SNS) account into the sensing unit 100, then performs the payment, the sensing unit 100 controls the image capture unit 200 so as to support a user to be able to take a selfie picture while displaying an image to be captured in real time in a preset background.

At this time, the image captured by the image capture unit 200 is transmitted to the data server 300, and the data server 300 transmits the captured image to the portable terminal of the user using the input personal information thereof. That is, the data server 300 transmits the taken picture using the telephone number, the e-mail address, or the SNS account of the user.

The image capture unit 200 is installed at a position in which a picture may be taken with each indoor photographing stage STAGE in the background.

For example, a plurality of image capture units may be installed on a ceiling portion of the exhibition hall, and each image capture unit may be configured to take a picture by taking charge of the plurality of indoor photographing stages STAGE, respectively. At this time, the image capture unit 200 may operate in conjunction with lightings installed on the ceiling portion. That is, the image capture unit 200 may determine a brightness of a photographing area, and then automatically adjust the brightness of the photographing area by controlling the brightness or illumination angles of the lightings installed on the ceiling portion.

In addition, when it is determined that there is an obstacle in the photographing area through object recognition of the image, the image capture unit 200 may automatically move so as to be able to photograph an entire body of the user. That is, when the image capture unit 200 is installed on the ceiling portion of the exhibition hall, it is preferable that rails for movement are installed, on which each of the plurality of image capture units can be automatically moved. In this case, the image capture unit may be moved to a predetermined position along the rail for movement by a driving unit for movement mounted thereon.

A photographing direction and a zoom magnification of the image capture unit 200 may be adjusted according to the control of the sensing unit 100. Such an image to be captured is displayed on a display unit of the sensing unit 100 or on a screen of the portable terminal 400 in real time, so as to support the user to be able to easily take a selfie picture.

That is, the image capture unit 200 captures an image with any one indoor photographing stage STAGE selected from the plurality of indoor photographing stages STAGE in the background, based on the positional information transmitted from the sensing unit 100 and the personal information of the user.

Herein, since the image includes both a moving image and a still image, the image capture unit 200 may selectively capture the moving image and the still image (picture) according to a selection of the user.

According to the embodiment, it may be configured that one image capture unit 200 takes charge of one indoor photographing stage STAGE, or otherwise, the image capture unit 200 takes charge of a plurality of indoor photographing stages STAGE allocated in advance by adjusting the photographing direction and the zoom magnification thereof.

The image capture unit 200 may use a pan-tilt-zoom (PTZ) camera. The PTZ camera collectively refers to a camera that can adjust the pan, tilt, and zoom thereof using motors. Accordingly, the PTZ camera can be rotated at specific angle and direction by the control of the sensing unit 100, thereby an area that can be photographed by the image capture unit may be adjusted.

The image capture unit 200 includes sensitive LEDs mounted thereon to identify objects at night, and auxiliary flood lights installed therein to enable a selfie at night. In this case, the indoor photographing stage STAGE is illuminated by a spotlight to facilitate the acquiring of the image.

The image capture unit 200 basically selects cameras having a resolution of megapixel-grade or higher while dividing into shot types of short-range, mid-range, and long-range, then the camera uses an IP network camera or a DSLR digital camera (equipped with a zoom lens). In this case, a method of acquiring a picture is operated by dividing it into a zoom lens driving method of automatically taking a plurality of pictures for each range, and a method of acquiring a single high-resolution picture in which an entire background appears, and automatically increasing a screen proportion of the taken picture, so as to obtain various pictures for each range.

In addition, the image capture unit 200 may transmit data using a wireless mesh network method.

That is, when a plurality of image capture units 200 are provided, each image capture unit wirelessly relays data to each other, thereby extending a data exchange limit distance between the sensing units 100, the portable terminal 400 and the data server 300.

For reference, the image capture unit 200 may be configured in such a way that a total of four microphones are arranged while having a difference in an angle of 90 degrees respectively, so as to collect sound by the microphones from each direction. At this time, partition walls are installed between the four microphones, which may subsidiarily help to identify the sound source. The microphone preferably uses a directional microphone. As such, when the directional microphone is provided, the image capture unit 200 may detect the voice of the user to determine a moving direction thereof.

For example, the image capture unit 200 may take charge of photographing in two stages STAGE of a first indoor photographing stage STAGE 1 and a second indoor photographing stage STAGE 2.

In this case, the image capture unit 200 may detect the sound generated when the user moves from the first indoor photographing stage STAGE1 to the second indoor photographing stage STAGE2, and may automatically photograph a moving process of the user.

At this time, the image capture unit 200 may capture an image by detecting a preset voice of the user. For example, if the user records "take 5 seconds later," the image capture unit 200 tracks the voice direction of the user to determine the photographing direction, and after recognizing the voice of "take 5 seconds later," then may capture an image after 5 seconds from a point of time when the voice was recognized.

Further, the image capture unit 200 may recognize voice commands of "take a moving image for 5 seconds," and "take a still image 5 times at 1 second intervals after 5 seconds," and then capture images according to the voice commands.

At this time, it may be configured in such a way that the voice commands such as "take a moving image for 5 seconds," and "take a still image 5 times at 1 second intervals after 5 seconds" are recognized by the sensing unit 100 to transmit it to the image capture unit 200, and the image capture unit 200 only tracks the direction of the voice.

The data server 300 stores the image data transmitted from the image capture unit 200 and the personal information of the user in a database, and transmits the image data to the user using the personal information such as a telephone number, an e-mail address, or an SNS account, which is input by the user in advance. The image data may be produced in a form of an electronic album to be transmitted to the user.

Accordingly, the user may perform a selfie in each indoor photographing stage STAGE, and then may receive the captured image by the portable terminal thereof using the phone number, the e-mail address, or the SNS account input by him or her in advance.

Meanwhile, the sensing unit 100 may receive the personal information of the user such as a telephone number, an e-mail address, an SNS account, and the like from the portable terminal 400 thereof through a wireless communication method.

At this time, the sensing unit 100 and the portable terminal 400 may be configured to exchange data with each other through a wireless communication method such as Bluetooth, near field communication (NFC) and the like. Therefore, it is possible to transmit the personal information of the user therebetween through a method of simply tagging the portable terminal 400 to the sensing unit 100 by the user.

Further, when the user tags the portable terminal 400 to the sensing unit 100, a link capable of downloading a photographing application is displayed.

When the user installs the photographing application on the portable terminal 400, the user may control the image capture unit 200 for a predetermined time using the photographing applications installed in the portable terminal 400 as well as the sensing unit 100.

That is, the portable terminal 400 may display an image to be captured in real time, and may transmit a control signal for instructing so as to perform the photographing at a specific point of time to the image capture unit 200. In addition, it may be configured that the portable terminal 400 may perform a payment of an amount for capturing an image through the photographing application installed therein.

As described above, it may be configured that, when receiving the personal information of the user by the sensing unit 100 from the portable terminal 400 thereof through the wireless communication method, the sensing unit 100 or the image capture unit 200 transmits the image to be captured in real time to the portable terminal 400.

At this time, it is preferable that the sensing unit 100, the image capture unit 200, the data server 300, and the portable terminal 400 are configured to exchange data with each other through the wireless communication method. The wireless communication method may use a near field wireless LAN method capable of quickly transmitting high-capacity data, or a broadband wireless communication method such as 3G and LTE methods.

FIG. 2 is a view illustrating an arrangement of the internet of things-based indoor selfie-supporting camera system 1 of FIG. 1.

Referring to FIG. 2, the sensing unit 100 receives the personal information of the user from a portable terminal thereof using a radio-frequency identification (RF) tagging method. That is, the image capture unit 200 is installed at a position in which a picture may be taken with each indoor photographing stage STAGE in the background.

The photographing direction and the zoom magnification of the image capture unit 200 may be adjusted according to the control of the portable terminal 400 or the sensing unit 100. Such an image to be captured is displayed on the display unit of the sensing unit 100 or on the screen of the portable terminal 400 in real time, so as to support the user to be able to easily take a selfie picture.

That is, the image capture unit 200 captures an image with any one indoor photographing stage STAGE selected from the plurality of indoor photographing stages STAGE in the background, based on the positional information transmitted from the sensing unit 100 and the personal information of the user.

Herein, since the image includes both a moving image and a still image, the image capture unit 200 may selectively capture the moving image and the still image (picture) according to a selection of the user.

According to the embodiment, it may be configured that one image capture unit 200 takes charge of one indoor photographing stage STAGE, or otherwise, the image capture unit 200 takes charge of a plurality of indoor photographing stages STAGE allocated in advance by adjusting the photographing direction and the zoom magnification thereof. For example, as illustrated in FIG. 2, a plurality of image capture units 200 installed on a ceiling of a building are disposed at positions capable of covering all the areas of the first to fourth stages STAGE 1 to 4, and then operates to photograph the corresponding area after receiving the positional information of the sensing units 100.

The image capture unit 200 may use the pan-tilt-zoom (PTZ) camera. The PTZ camera collectively refers to a camera that can adjust the pan, tilt, and zoom thereof using motors. Accordingly, the PTZ camera can be rotated at specific angle and direction by the control of the sensing unit 100, thereby the area that can be photographed by the image capture unit may be adjusted.

FIG. 3 is image data photographed using the internet of things-based indoor selfie-supporting camera system 1 of FIG. 1.

Referring to FIG. 3, the image capture unit 200 may use the pan-tilt-zoom (PTZ) camera. The PTZ camera collectively refers to a camera that can adjust the pan, tilt, and zoom thereof using motors. Accordingly, the PTZ camera can be rotated at specific angle and direction by the control of the sensing unit 100, thereby the area that can be photographed by the image capture unit may be adjusted.

The image capture unit 200 may capture an image by enlarging a user through zoom adjustment, or may capture an image at a high image quality, and then enlarge a specific portion of the image to generate a final image. That is, it is possible to capture an image when enlarging or reducing a screen size of a selfie user to be captured in shot types of small (long-shot), medium (mid-shot), and large (close-up) in the entire picture. Herein, the small is defined as a shot type of picture in which the background is taken with the best view, the middle is defined as a shot type of picture taken in consideration of both the background and the person, and the large is defined as a shot type of a picture focused on a person.

At this time, when the image capture unit 200 transmits the final image to the sensing unit 100 or the portable terminal 400, a time, a specific figure, or specific data may be inserted into the final image.

Meanwhile, the data server 300 determines whether the user has visited all the plurality of indoor photographing stages STAGE based on the positional information, the image data, and the personal information of the user.

When it is determined that the user has visited all the plurality of indoor photographing stages STAGE, the data server transmits information of the user to a preset augmented reality game server.

Thereby, when the user accesses the augmented reality game server to play a game, the augmented reality game server may operate in conjunction with the data server so as to dispose augmented reality game items around the plurality of indoor photographing stages STAGE.

At this time, the data server 300 analyzes the captured image of the user to determine visiting times at each indoor photographing stage STAGE and moving lines of the user, and then transmits analysis information to the augmented reality game server. The augmented reality game server identifies arrangement positions of the augmented reality game items based on information on the moving lines of the user, and the like transmitted from the data server 300.

In addition, the image capture unit 200 operates in any one mode of a selfie-supporting mode and a security mode. The selfie-supporting mode is a mode to support the user to be able to take a selfie picture as described above.

An administrator may switch the selfie-supporting mode to the security mode by controlling the sensing unit 100 or using a his or her portable terminal. Alternately, the selfie-supporting mode and the security mode may be automatically switched according to a preset time.

That is, in the security mode, the image capture unit 200 automatically determines the photographing direction based on detected data of the pressure sensors disposed on the bottom surfaces of the plurality of indoor photographing stages STAGE or object recognition of the image, and transmits an image captured in the security mode to the data server 300 in real time.

That is, the image capture unit 200 basically captures an image in a preset area while rotating up and down and left and right. When the detected data of the pressure sensors disposed on the bottom surfaces of the plurality of indoor photographing stages STAGE is transmitted, briefly, an intruder approaches the indoor photographing stage STAGE, the image capture unit intensively photographs the area around the intruder.

In addition, when an intruder such as a person is recognized while the image capture unit 200 recognizes the captured image as an object, the photographing unit 200 operates so as to continuously photograph the object.

At this time, when determining the intruder through the object recognition in the security mode, the image capture unit 200 may distinguish the manager or a patroller from the intruder by using the following method.

It is configured in such a way that, when the patroller makes a predetermined gesture for a preset time at a predetermined place, the image capture unit 200 recognizes the patroller as an authorized person.

In addition, when the patroller wears clothes of a specific color, the image capture unit 200 may recognize the person wearing the clothes of the specific color as an authorized person. In this case, it is preferable that the permitted colors are set differently for each day of the week and for each hour.

Further, when the patroller wears clothes on which a specific QR code or a mark is printed, or an attachment is attached, the image capture unit 200 may recognize the code or mark, then determine the patroller as an authorized person according to values applied to the recognized code or mark.

For reference, in order to more clearly recognize the object in the image capture unit 200, the QR code or mark attached to the patroller's clothes may be coated with an infrared reflective paint that reflects a specific infrared wavelength. Further, the image capture unit 200 may have a spectroscopic filter mounted thereon to control the infrared transmission wavelength. By mounting the spectroscopic filter to the image capture unit 200, it is possible to more reliably identify the code and mark coated with the infrared reflective paint.

In addition, in a case of mounting the spectroscope filter that adjusts the infrared transmission wavelength on the image capture unit, a camera for photographing an infrared wavelength area and a camera for photographing a visible light area may be disposed in a pair. As such, when a pair of cameras are allocated to each indoor photographing stage STAGE and the QR code or mark attached to the clothes of the patroller is coated with the infrared reflecting paint that reflects a specific infrared wavelength, the image capture units 200 or the data server 300 may more accurately perform the object recognition operation by comparing the image captured in the infrared area with the image captured in the visible ray area. That is, by mounting the spectral filter on the image capture unit 200, it is possible to more reliably identify the code and mark coated with the infrared reflective paint.

In addition, when the patroller wears a patroller suit coated with an infrared reflective paint or gloves coated with an infrared reflective paint on hands, the image capture unit 200 may more reliably recognize even operations of the patroller.

That is, it is preferable that the image capture unit 200 may capture both a still image and a moving image in a visible light band, and both a still image and a moving image in an infrared band.

When recognizing that an object further possesses a specific thing during patrolling, even if the object is an authorized patroller, the image capture unit 200 recognizes as a situation requiring attention, and transmits the situation to the data server 300. That is, by monitoring even behavior of the patroller, reliability of security may be improved.

In accordance with the internet of things-based indoor selfie-supporting camera system 1 according to an embodiment of the present invention, it is possible to capture an image with the indoor photographing stages in which a user is located in the background, and conveniently transmit the image data using personal information of the user to the portable terminal thereof.

Further, in accordance with the internet of things-based indoor selfie-supporting camera system 1 according to the embodiment of the present invention, it is possible to solve a situation in which a desired image cannot be obtained at a limited angle of view, automatically capture a user's own image for each shot type of a short-range, a mid-range, and a long-range together with surrounding environments by a simple operation, and transmit the captured image to the user in various ways such as an e-mail or a short message service through a network transmission, as well as, provide past photo data to the user in future visits according to an additional request thereof by storing the photo data requested by the user in a database. In addition, it is possible to obtain a desired selfie picture, which is hard to be obtained by operating the camera with his or her hand, by driving the image capture units 200 in real time, which are installed in advance at a short range, and mid/long ranges.

Meanwhile, according to various embodiments of the present invention, when setting the image capture unit 200 in the selfie-supporting mode, the camera system 1 may capture various images for providing various services to the user.

In one embodiment, when a positional information of the user is received and a photographing command is input, the image capture unit 200 may capture a moving image of the user. At this time, the image capture unit 200 may capture the user while moving based on the positional information of the user. In this case, the positional information of the user may be acquired through various methods. For example, an initial positional information of the user may be acquired based on the pressure sensor, and after starting the photographing, the positional information of the user may be acquired based on a subject of the user captured by the image capture unit 200. As another example, when implementing the system in a form in which the pressure sensors for acquiring the positional information of the user are distributed throughout the indoor photographing stage, the image capture unit 200 may acquire the positional information of the user based on the positional information from the pressure sensor that has detects a preset pressure or more.

The image capture unit 200 may capture the user by moving according to the positional information of the user. At this time, a moving direction, moving speed, and moving distance of the image capture unit 200 may be determined according to the positional information of the user. For example, the image capture unit 200 may move so as to capture the user at a specific position of the image. The specific position may be set in various ways such as a center of the image, a preset range from a specific object included in the image and the like.

Meanwhile, when the user moves the stages, the image capture unit 200 for capturing a specific stage (for example, a STAGE 1) may no longer capture the user. Therefore, the camera system 1 may transmit the positional information of the user to the image capture unit 200 of the adjacent stage, so that even when the user moves the stages, the camera system 1 may reliably perform the photographing.

In one embodiment, when the position of the image capture unit 200 moves within the preset range from a STAGE 2 and comes closer to the STAGE 2 by moving the image capture unit 200 of the STAGE 1, the camera system 1 may control the image capture unit 200 of the STAGE 2 so as to move the image capture unit 200 of the STAGE 2 to the STAGE 1 direction, thus to capture the STAGE 1 direction.

In another embodiment, when the image capture unit 200 of the STAGE 1 is a camera for photographing the STAGE 1 with being fixed, and the position of the user captured by the image capture unit 200 of the STAGE 1 moves in an outer direction of the image, the camera system 1 may control the image capture unit 200 of the STAGE 2 so that the image capture unit 200 of the STAGE 2 starts the photographing.

According to the above-described method, when the user moves the respective stages, the camera system 1 may capture all the movements of the user. The camera system 1 may receive and synthesize images of the user captured at the respective stages to acquire a single captured image. That is, the camera system 1 may acquire the single captured image of the user who moves in a wide range based on a plurality of divided cameras.

In acquiring the single captured image, the camera system 1 captures so that a subject of the user is located at a specific position such as the center of the image, thereby it is possible to acquire a single image without a difference even when acquiring the single captured image by synthesizing a plurality of images.

As such, the present invention has been described in detail with reference to the embodiments, but it should be understood by those skilled in the art that the present invention may be implemented in other specific embodiments without changing the technical idea and essential characteristics of the invention. Accordingly, it should be understood that the above-described embodiments are only intended to illustrate the present invention and are not intended to limit the scope thereof in all aspects. Therefore, the scope of the present invention should be defined by accompanying claims, and it should be interpreted that all alterations and modifications of the embodiments deduced from meaning and scope of the accompanying claims and equivalent concept thereof are included within the scope and spirit of the present invention.

The invention claimed is:

1. An internet of things-based indoor selfie-supporting camera system, the system comprising:
   sensing units respectively disposed in a plurality of indoor photographing stages to receive personal information from a portable terminal of a user using a radio-frequency identification (RF) tagging method;
   image capture units including a camera configured to capture an image with any one indoor photographing stage selected from the plurality of indoor photographing stages in the background, based on positional information transmitted from the sensing units and the personal information of the user; and
   a data server configured to store image data transmitted from the image capture units and the personal information of the user in a database, and transmit the image data using the personal information of the user,
   wherein the image capture unit is equipped with a plurality of directional microphones to detect a sound direction generated when the user moves on the indoor shooting stage, thereby automatically photographing the user's moving process,
   wherein the image capture unit proceeds to take an image by recognizing a voice command including a photographing delay time, a photographing period, and a number of photos to be taken,
   in a case where the image capture unit operates in any one of a self-portrait support mode and a security mode, in the security mode, when a patrol wears clothes or attachments printed with a predetermined QR code or mark,
   wherein the image capture unit captures the predetermined QR code or mark and the data server recognized the patrol as an authorized person using the captured image of the predetermined QR code or the mark,
   wherein the image capture unit is further equipped with a spectroscope filter that adjusts an infrared transmission wavelength for capturing the predetermined the QR code or the mark, which is coated with an infrared reflective paint that reflects a specific infrared wavelength, thereby identifying the predetermined QR code or the mark coated with the infrared reflective paint.

2. The system according to claim 1, wherein, when receiving the personal information of the user by the sensing unit from the portable terminal of the user through a wireless communication method, the image capture unit transmits an image to be captured to the portable terminal of the user in real time using the received personal information of the user.

3. The system according to claim 1, wherein the personal information includes at least one or more of a telephone number, an e-mail address, and a social network service account.

4. The system according to claim 1, wherein the image capture unit operates in any one mode of a selfie-supporting mode and a security mode, and in the security mode, the image capture unit automatically determines a photographing direction based on detected data of pressure sensors disposed on bottom surfaces of the plurality of indoor photographing stages and object recognition of the image, and transmits an image captured in the security mode to the data server in real time.

5. The system according to claim 1, wherein the image capture unit operates in any one mode of a selfie-supporting mode and a security mode, and the selfie-supporting mode and the security mode are automatically switched according to a preset time.

6. The system according to claim 1, wherein the data server determines whether the user has visited all the plurality of indoor photographing stages based on the positional information, the image data, and the personal information of the user, and when it is determined that the user has visited all the plurality of indoor photographing stages, transmits information of the user to a preset augmented reality game server, and
   when the user accesses the augmented reality game server to play a game, the augmented reality game server disposes augmented reality game items around the plurality of indoor photographing stages.

7. The system according to claim 1, wherein the image capture unit is configured to capture a still image and a moving image in a visible light band, and a still image and a moving image in an infrared band for comparing the image captured in the infrared area with the image captured in the visible light band.

8. The system according to claim 1, wherein the image capture unit is configured to automatically move a position thereof, when an obstacle exists in a photographing area.

* * * * *